United States Patent
Ruch et al.

[11] Patent Number: 5,871,575
[45] Date of Patent: Feb. 16, 1999

[54] CRYSTAL MODIFICATION OF A DIKETOPYRROLOPYRROLE PIGMENT

[75] Inventors: Thomas Ruch; Olof Wallquist, both of Marly, Switzerland

[73] Assignee: Ciba Specialty Chemicals Corporation, Tarrytown, N.Y.

[21] Appl. No.: 916,659

[22] Filed: Aug. 22, 1997

[30] Foreign Application Priority Data

Aug. 22, 1996 [CH] Switzerland .............................. 2060/96

[51] Int. Cl.$^6$ ................................................. C07D 487/04
[52] U.S. Cl. .......................... 106/498; 106/493; 106/494; 106/499; 106/506; 524/92; 524/104; 548/453
[58] Field of Search ........................... 548/453; 106/493, 106/494, 498, 499, 506; 524/92, 104, 597, 720

[56] References Cited

U.S. PATENT DOCUMENTS

| | | | |
|---|---|---|---|
| 4,415,685 | 11/1983 | Iqbal et al. ................................. | 524/92 |
| 4,579,949 | 4/1986 | Rochat et al. ........................... | 546/167 |
| 5,095,122 | 3/1992 | Bugnon et al. .......................... | 548/453 |
| 5,347,014 | 9/1994 | Bäbler ..................................... | 548/453 |
| 5,354,869 | 10/1994 | Langhals et al. ........................ | 548/453 |
| 5,518,539 | 5/1996 | Hao et al. ................................ | 106/495 |
| 5,591,865 | 1/1997 | Hao et al. ................................ | 548/453 |
| 5,646,299 | 7/1997 | Hao et al. ................................ | 548/453 |
| 5,650,520 | 7/1997 | Hao et al. ................................ | 548/453 |
| 5,708,188 | 1/1998 | Hao et al. ................................ | 548/453 |

FOREIGN PATENT DOCUMENTS

| | | |
|---|---|---|
| 0690058 | 1/1996 | European Pat. Off. . |
| 0690059 | 1/1996 | European Pat. Off. . |
| 0748851 | 12/1996 | European Pat. Off. . |

*Primary Examiner*—Joseph K. McKane
*Attorney, Agent, or Firm*—Kevin T. Mansfield

[57] ABSTRACT

A diketopyrrolopyrrole of formula

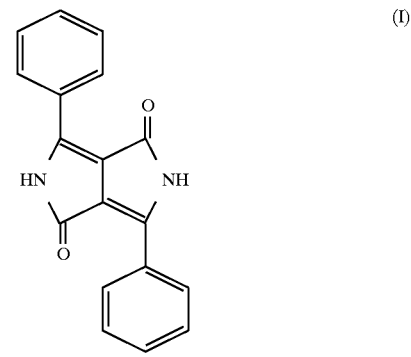

(I)

in its β-modification.

The novel β-modification is also suitable as pigment for coloring high molecular weight organic materials. In comparison to the α-modification, it has a shade shifting towards blueish red, enhanced color strength and chroma as well as an enhanced resistance to heat.

10 Claims, No Drawings

CRYSTAL MODIFICATION OF A DIKETOPYRROLOPYRROLE PIGMENT

The present invention relates to a novel crystal modification of 1,4-diketo-3,6-diphenylpyrrolo[3,4-c]pyrrole, to its preparation as well as to the use of this novel product as pigment.

It is generally known that a number of representatives of different classes of organic pigments, in particular in phthalocyanine pigments, quinacridone pigments and some azo pigments, are polymorphous, i.e. despite having the same chemical composition such pigments occur in two or more crystal modifications. In the case of the diketopyrrolopyrrole pigments, which have been known for some years and which are described, inter alia, in U.S. Pat. Nos. 4,415,685 and 4,579,949, different modifications are only known for the three pigments of formulae

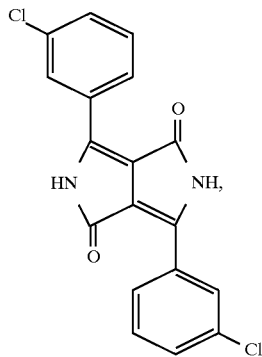

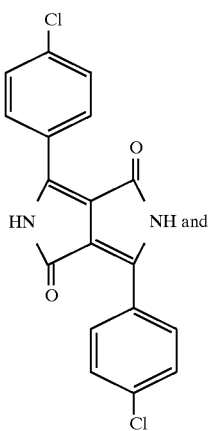

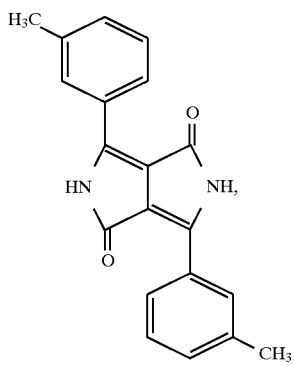

as disclosed in U.S. Pat. No. 5,591,865, EP-A 690 059 and EP-A 690 059. They are obtained by reconverting a soluble latent pigment form under specific conditions to the pigment form.

Very surprisingly, it has now been found that a novel crystal modification of the pigment of formula I is obtained by changing the synthesis of the pigment of formula

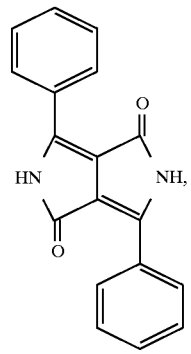

(I)

which is described in Example 1 of U.S. Pat. No. 4,579,949, by adding a small amount of a cyano-substituted diketopyrrolopyrrole before or during synthesis and, after protolysis, heating the protolysis mixture to 50° to 150° C. The novel modification, referred to hereinafter as the β-modification, differs from the known modification, referred to hereinafter as the α-modification, by a specific different X-ray diffraction pattern, by a shift in shade towards blueish red and also by markedly higher colour strength and chroma as well as by an enhanced resistance to heating.

The complete X-ray diffraction patterns are determined by conventional methods using a Siemens D500® X-ray diffractometer ($CuK_\alpha$ radiation).

The X-ray diffraction pattern of the known α-modification is characterised by the following diffraction lines:

| Interplanar spacings (d values in Å) | Double glancing angles (2Ø) | Relative intensity % |
|---|---|---|
| 13.9705 | 6.322 | 100 |
| 6.0698 | 14.582 | 49 |
| 5.8511 | 15.130 | 18 |
| 4.5886 | 19.328 | 18 |
| 3.8456 | 23.110 | 11 |
| 3.7449 | 23.740 | 23 |
| 3.3986 | 26.200 | 51 |
| 3.1710 | 28.118 | 33. |

This invention relates to the diketopyrrolopyrrole of formula

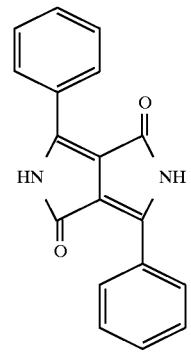

(I)

in its β-modification, the X-ray diffraction pattern of which is characterised by the following diffraction lines:

| Interplanar spacings (d values in Å) | Double glancing angles (2 Ø) | Relative intensity % |
|---|---|---|
| 13.8817 | 6.362 | 100 |
| 4.9411 | 17.938 | 24 |
| 4.6743 | 18.971 | 26 |
| 4.5976 | 19.290 | 21 |
| 4.4193 | 20.076 | 11 |
| 3.3932 | 26.242 | 35 |
| 3.3195 | 26.836 | 33 |
| 3.0419 | 29.337 | 12. |

This novel β-modification is prepared by reacting 1 mol of a dialkyl succinate or diphenyl succinate, where the alkyl in the succinate moiety is $C_1$–$C_{18}$alkyl and the phenyl is unsubstituted or substituted by one or two halogen atoms, one or two $C_1$–$C_6$alkyl groups or $C_1$–$C_6$-alkoxy groups, with 2 mol of benzonitrile in an inert organic solvent in the presence of an alkali metal or alkali metal alcoholate as a strong base at elevated temperature to a pigment alkali metal salt which is subsequently protolysed to the diketopyrrolopyrrole of formula I and then conditioned by commonly known methods,
which comprises adding before or during the above synthesis 2.2–20 mol % of a diketopyrrolopyrrole of formula

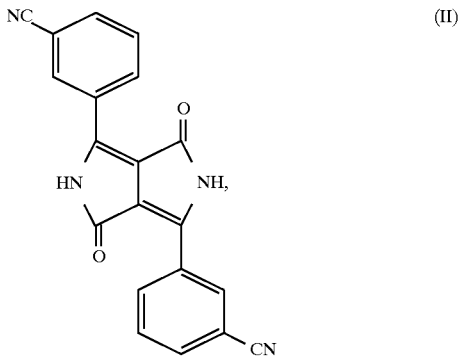

(II)

and carrying out the conditioning at a temperature in the range from 50° to 120° C. $C_1$–$C_{18}$Alkyl in the succinate moiety is typically methyl, ethyl, n-propyl, isopropyl n-butyl, tert-butyl, amyl, hexyl, octyl, 2,2-dimethylhexyl, decyl, dodecyl, hexadecyl or octadecyl.

$C_1$-$C_6$Alkyl and $C_1$–$C_6$alkoxy as phenyl substituents in the succinate moiety are typically methyl, ethyl, n-propyl, isopropyl, n-butyl, tert-butyl, amyl, hexyl, or methoxy, ethoxy, n-propoxy, isopropoxy, n-butoxy, amyloxy and hexyloxy.

The addition of the diketopyrrolopyrrole of formula II is conveniently carried out prior to the protolysis of the pigment alkali salt or, preferably, at the start of the synthesis before the succinate and nitrile are added to the solvent and base. The diketopyrrolopyrrole of formula II is preferably added in an amount of 2.5–10 mol % and, most preferably, in an amount of 2.5–6 mol %.

Diketopyrrolopyrroles of formula II are known substances and can be prepared e.g. according to the process disclosed in U.S. Pat. No. 4,579,949. The protolysis is conveniently carried out at a pH>9, preferably at a pH≧11 and, most preferably, at a pH>12. To adjust the pH it is possible to add acid before, during or after the protolysis. Suitable acids are organic or inorganic acids. The conditioning is preferably carried out at a temperature in the range from 50° to 120° C., particularly preferably from 50° to 80° C. The novel β-diketopyrrolopyrrole is suitable as pigment for colouring high molecular weight organic materials, as has also been described, inter alia, in U.S. Pat. Nos. 4,415,685 and 4,579,949 for its α-modification.

Like many other pigments, the novel β-diketopyrrolopyrrole can also be advantageously surface-treated by known methods to improve its properties in paint systems. Additives used to reduce or prevent flocculation and to improve the dispersion stability can be advantageously used together with the novel pigment. The pigment treated in this manner has good properties, alone or mixed with other pigments, for the production of red masstone colorations in different paint systems, but preferably in automotive paint systems of the acrylic, alkyd and polyester type. 2-Phthalimidomethylquinacridone, quinacridonesulfonic acid and other similar derivatives are examples of deflocculating agents which can be used.

In certain systems, the addition of polymeric dispersants can further improve the properties of the pigment.

The novel β-diketopyrrolopyrrole is used in amounts of 0.01 to 30% by weight, preferably of 0.1 to 10% by weight, based on the high molecular weight organic material to be coloured and is conveniently incorporated therein at temperatures in the range from 20° to 180° C.

The novel β-diketopyrrolopyrrole may typically be used as a powder, paste, flush paste or formulation and is suitable, for example, for use in printing inks, size colours, binder colours or paints of all kinds, such as physically and oxidatively drying paints, acid-, amine- and peroxide-curing paints, or polyurethane paints. Owing to its high resistance to heat, the pigment can also be used for colouring synthetic, semi-synthetic or natural macromolecular materials, even those which are processed at high temperatures, possibly together with other organic or inorganic pigments. The colorations so obtained, e.g. in paints, prints or in plastic materials, are distinguished by a blueish red shade, good fastness to overspraying, migration, light and weathering, as well as, in particular, by excellent colour strength and chroma.

The novel pigment may be used for colouring solid, elastic, paste-like, viscous, low-viscous or thixotropic materials and may be incorporated therein by methods which are known per se. For example, water-containing pastes can be obtained by stirring the pigment into water, with or without the addition of a wetting agent or dispersant, or by stirring or kneading the pigment into a dispersant in the presence of water and, optionally, in the presence of organic solvents or oils. These pastes may in turn be used e.g. to prepare flush pastes, printing inks, size colours and plastics dispersions. However, the pigment can also be introduced into water, organic solvents, non-drying oils, drying oils, paints, plastics or rubber by stirring, rolling, kneading or grinding. Finally, it is also possible to process the pigment to compositions by dry mixing it with organic or inorganic materials, granulates, fibre materials, powders and other pigments.

The following Examples illustrate the invention in more detail.

EXAMPLE 1

23.0 g of sodium are added to 150 ml of dry tert-amyl alcohol and this mixture is heated to 100° C. and stirred until the sodium has completely reacted. This solution is cooled to 100° C. and there are then added to it first 2.3 g (6.7 mmol) of the diketopyrrolopyrrole of formula II, then 31.25 g (99%, 0.3 mol) of benzonitrile and 50 ml of tert-amyl alcohol and subsequently 39.4 g of diisopropyl succinate over 11 hours. At the end of the addition, the mixture is diluted with 40 ml of tert-amyl alcohol and stirring is continued for 2 hours at 95° C. The reaction mixture is then added warm to a mixture consisting of 170 ml of water and 170 ml of methanol at a starting temperature of 28° C. When the addition is complete, the mixture is stirred for 5 hours at 45°–48° C., heated to 70° C. overnight and then filtered. The residue is washed with methanol and water until the filtrate is colourless and is then dried in a vacuum drying oven at 80° C. 27.76 g of a red product are obtained which gives a blueish red transparent coloration in PVC.

| Analysis: | C | H | N |
|---|---|---|---|
| calcd.: | 75.0% | 4.2% | 9.7% |
| found: | 74.8% | 4.2% | 9.8% |

The X-ray diffraction pattern is characterised by the following diffraction lines:

| Interplanar spacings (d-values in Å) | Double glancing angles (2Ø) | Relative intensity % |
|---|---|---|
| 13.8817 | 6.362 | 100 |
| 4.9411 | 17.938 | 24 |
| 4.6743 | 18.971 | 26 |
| 4.5976 | 19.290 | 21 |
| 4.4193 | 20.076 | 11 |
| 3.3932 | 26.242 | 35 |
| 3.3195 | 26.836 | 33 |
| 3.0419 | 29.337 | 12 |

EXAMPLE 2

23.0 g of sodium are added to 150 ml of dry tert-amyl alcohol and this mixture is heated to 100° C. and stirred until the sodium has completely reacted. This solution is cooled to 100° C. and there are then added to it first 1.52 g (4.5 mmol) of the diketopyrrolopyrrole of formula II, then 31.25 g (99%, 0.3 mol) of benzonitrile and 10 ml of tert-amyl alcohol and subsequently 39.4 g of diisopropyl succinate over 5 hours. At the end of the addition, the mixture is stirred for another 1 hour at 100° C. The reaction mixture is then added to a mixture consisting of 170 ml of water and 170 ml of methanol, concentrated sulfuric acid being added at the same time to keep the pH at 12.3. Upon completion of the addition, the mixture is kept for 1 hour at 66° C. and is then refluxed for 6 hours and filtered. The residue is washed with methanol and water, until the filtrate is colourless and is then dried in a vacuum drying oven at 80° C., giving 33.88 g of a red product which is slightly more blueish than that of Example 1.

| Analysis: | C | H | N |
|---|---|---|---|
| calcd.: | 75.0% | 4.2% | 9.7% |
| found: | 74.4% | 4.3% | 10.1% |

EXAMPLE 3

The general procedure of Example 2 is repeated, using 1.27 g (3.8 mmol) of the diketopyrrolopyrrole of formula II. 31.1 g of a red pigment is obtained which gives a red transparent coloration in PVC.

| Analysis: | C | H | N |
|---|---|---|---|
| calcd.: | 75.0% | 4.2% | 9.7% |
| found: | 74.3% | 4.3% | 9.9% |

EXAMPLE 4

The general procedure of Example 1 is repeated, using 5 g (15 mmol) of the diketopyrrolopyrrole of formula II. 27.14 g of a red pigment are obtained which gives a red transparent coloration in PVC.

| Analysis: | C | H | N |
|---|---|---|---|
| calcd.: | 75.0% | 4.2% | 9.7% |
| found: | 73.9% | 4.3% | 9.9% |

EXAMPLE 5

18.4 g of sodium are added to 200 ml of dry tert-amyl alcohol and this mixture is heated to 100° C. and stirred until the sodium has completely reacted. This solution is cooled to 105° C. and there are then added to it first 1.8 g (5.4 mmol) of the diketopyrrolopyrrole of formula II, then 41.7 g (99%, 0.4 mol) of benzonitrile and 10 ml of tert-amyl alcohol and subsequently 52.6 g of diisopropyl succinate over 5 hours. At the end of the addition, the mixture is stirred for another 1 hour at 104° C. The reaction mixture is then added warm to a mixture consisting of 170 ml of water and 170 ml of methanol at a starting temperature of 50° C. Upon completion of the addition, the mixture is heated for 1 hour to 50° C. and then for 2 hours to 60° C. and is then filtered. The residue is washed with methanol and water until the filtrate is colourless and is then dried in a vacuum drying oven at 80° C. 42 g of a red product are obtained which gives a red transparent coloration in PVC.

EXAMPLE 6

7.5 g of the pigment, the preparation of which is described in Example 1, 98.9 g of CAB solution consisting of 41.00 g of cellulose acetobutyrate ®CAB 531.1, 20% in butanol/xylene 2:1 (Eastman Chem.)

1.50 g of zirconium octoate 18.50 g of ®SOLVESSO 150*

21.50 g of butyl acetate, and 17.50 g of xylene 36.50 g of polyester resin ®DINAPOL H700 (Dynamit Nobel), 4.60 g of melamine resin ®MAPRENAL MF650 (Hoechst) and 2.50 g of dispersant ®DISPERBYK 160 (BykChemie) are dispersed together for 90 minutes in a disperser (total varnish: 150 g, 5% pigment).

*®SOLVESSO 150=aromatic solvent from ESSO

For the base coat finish, 27.69 g of the masstone paint are mixed with 17.31 g of Al stock solution (8%) consisting of 12.65 g of ®SILBERLINE SS 3334AR, 60% (Silberline Ltd.)

56.33 g of CAB solution (composition as above)

20.81 g of polyester resin ®DINAPOL H700

2.60 g of melamine resin ®MAPRENAL MF650

7.59 g of ®SOLVESSO 150* and sprayed onto an aluminium sheet (wet film about 20 μm). After drying in the air for 30 minutes at room temperature, a TSA varnish consisting of 29.60 g of acrylic resin ®URACRON 2263 XB, 50% in xylene/butanol (Chem. Fabrik Schweizerhalle), 5.80 g of melamine resin OCYMEL 327, 90% in isobutanol, 2.75 g of butyl glycol acetate, 5.70 g xylene, 1.65 g of n-butanol, 0.50 g of silicone oil, 1% in xylene, 3.00 g of light stabiliser ®TINUVIN 900, 10% in xylene (Ciba), 1.00 g of light stabiliser ®TINUVIN 292, 10% in xylene (Ciba)

is sprayed thereon as top coat finish (wet film about 50 lim). After drying in the air for another 30 minutes at room temperature, the varnish is stoved for 30 minutes at 130° C.

EXAMPLE 7

0.6 g of the pigment prepared according to Example 1 are mixed with 67 g of polyvinyl chloride, 33 g of dioctylphthalate, 2 g of dibutyl tin dilaurate and 2 g of titanium dioxide and processed on a roll mill for 15 minutes at 160° C. to a thin film. The red PVC film so obtained is distinguished by very good fastness properties.

EXAMPLE 8

A mixture of 1.0 g of the pigment obtained in Example 1, 1.0 g of antioxidant (IRGANOX® 1010, CIBA-GEIGY AG) and 1000 g of polyethylene-HD granulate (®VESTOLEN 60-16, HUELS) is premixed for 15 minutes is a glass flask on a roller gear table. The mixture is then extruded in two passes in a single screw extruder and the granulate so obtained is moulded to plates in an injection moulding machine (Ferromatik Aarburg 200) in portions for 5 minutes each at 200°, 220°, 240°, 260°, 280° and 300° C. All pressed plates so obtained are of a blueish red shade having good fastness properties.

What is claimed is:

1. A diketopyrrolopyrrole of formula

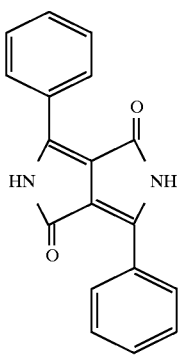

(I)

in its β-modification, wherein the X-ray diffraction pattern consists of the following diffraction lines:

| Interplanar spacings (d values in Å) | Double glancing angles (2 Ø) | Relative intensity % |
|---|---|---|
| 13.8817 | 6.362 | 100 |
| 4.9411 | 17.938 | 24 |
| 4.6743 | 18.971 | 26 |

| Interplanar spacings (d values in Å) | Double glancing angles (2 Ø) | Relative intensity % |
|---|---|---|
| 4.5976 | 19.290 | 21 |
| 4.4193 | 20.076 | 11 |
| 3.3932 | 26.242 | 35 |
| 3.3195 | 26.836 | 33 |
| 3.0419 | 29.337 | 12. |

2. A process for the preparation of the diketopyrrolopyrrole according to claim 1 by reacting 1 mol of a dialkyl succinate or diphenyl succinate, where the alkyl in the succinate moiety is $C_1$–$C_{18}$alkyl and the phenyl is unsubstituted or substituted by one or two halogen atoms, one or two $C_1$–$C_6$alkyl groups or $C_1$–$C_6$-alkoxy groups, with 2 mol of benzonitrile in an inert organic solvent in the presence of an alkali metal or alkali metal alcoholate as a strong base at elevated temperature to a pigment alkali metal salt which is subsequently protolysed to the diketopyrrolopyrrole of formula I and then conditioned by commonly known methods, which comprises adding before or during the above synthesis 2.2–20 mol % of a diketopyrrolopyrrole of formula

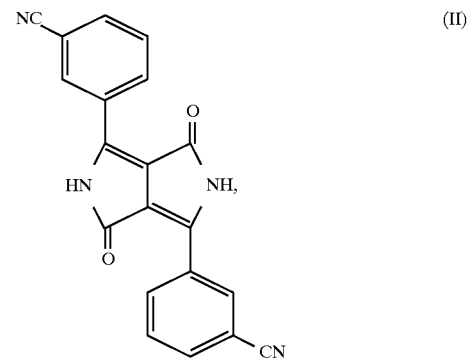

(II)

and carrying out the conditioning at a temperature in the range from 50° to 120° C.

3. A process according to claim 2, which comprises adding the diketopyrrolopyrrole of formula II prior to the protolysis of the pigment alkali metal salt.

4. A process according to claim 3, which comprises adding the diketopyrrolopyrrole of formula II at the start of the synthesis.

5. A process according to claim 2, which comprises adding the diketopyrrolopyrrole of formula II in an amount of 2.5–10 mol %.

6. A process according to claim 5, which comprises adding the diketopyrrolopyrrole of formula II in an amount of 2.5–6 mol %.

7. A process according to claim 2, which comprises carrying out the conditioning at a temperature in the range from 50° to 120° C.

8. A process according to claim 7, which comprises carrying out the conditioning at a temperature in the range from 50° to 80° C.

9. A process according to claim 2, which comprises carrying out the conditioning at a pH≧11.

10. A composition comprising a tinctorially effective amount of a diketopyrrolopyrrole as claimed in claim 1 and a high molecular weight organic material.

* * * * *